(12) United States Patent
Ferwerda et al.

(10) Patent No.: US 7,774,403 B2
(45) Date of Patent: *Aug. 10, 2010

(54) SYSTEM AND METHOD FOR CONCENTRATION AND LOAD-BALANCING OF REQUESTS

(75) Inventors: Paul Ferwerda, Bedford, NH (US); Peter Bower, Hollis, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/262,632

(22) Filed: Oct. 31, 2005

(65) Prior Publication Data

US 2006/0069723 A1   Mar. 30, 2006

Related U.S. Application Data

(63) Continuation of application No. 09/907,025, filed on Jul. 17, 2001, now Pat. No. 6,990,511.

(60) Provisional application No. 60/221,057, filed on Jul. 27, 2000.

(51) Int. Cl.
*G06F 15/16* (2006.01)
(52) U.S. Cl. .............. 709/201; 709/223; 709/224; 709/225; 709/226; 709/239; 709/240; 709/241; 718/105; 718/108; 719/315; 719/316; 719/330; 719/331; 719/332
(58) Field of Classification Search ......... 709/201–227, 709/231; 719/316–330; 726/5
See application file for complete search history.

(56) References Cited

U.S. PATENT DOCUMENTS 5,329,619 A * 7/1994 Page et al. ............ 709/203
5,553,242 A * 9/1996 Russell et al. ............ 709/227
5,717,747 A * 2/1998 Boyle et al. ............ 379/201.03
5,727,145 A * 3/1998 Nessett et al. ............ 726/5
5,748,897 A * 5/1998 Katiyar ............ 709/219
5,754,763 A * 5/1998 Bereiter ............ 726/28
5,761,507 A   6/1998 Govett
5,774,668 A * 6/1998 Choquier et al. ............ 709/223

(Continued)

FOREIGN PATENT DOCUMENTS

EP   0 822 492 A2   2/1998

(Continued)

OTHER PUBLICATIONS

Yang, Z. and Duddy, K., "CORBA: A Platform for Distributed Object Computing," Operating Systems Review, ACM, New York, NY, US, vol. 30, No. 2, Apr. 1, 1996.

*Primary Examiner*—Hassan Phillips
*Assistant Examiner*—Backhean Tiv
(74) *Attorney, Agent, or Firm*—Fliesler Meyer LLP

(57) ABSTRACT

A system and method for concentration and load-balancing of requests in a distributed computing environment. In accordance with an embodiment, a system and a method for reducing the number of connections in an Internet environment using one or a plurality of connection handlers which handle the connection from the client to the server, and a listener which determines which connection handler to use to handle the connection. Whereas prior solutions required a (n×m) number of connections to handle requests, the invention allows there to be only m connections which significantly reduces resource requirements and allows scalability.

15 Claims, 13 Drawing Sheets n client/servers (inside the domain) invoking on 1 remote server (outside the domain) via ISL/ISH intelligent concentrator results in 1 TCP/IP socket connection. On first invoke on object, client contact ISL to determine ISH to handle invoke. ISL maintains information about active TCP/IP socket connections in ISH processes, and concentrates invokes allowing request to be multiplexed over 1 connection.

U.S. PATENT DOCUMENTS

| | | | |
|---|---|---|---|
| 5,793,965 A * | 8/1998 | Vanderbilt et al. | 709/203 |
| 5,808,911 A * | 9/1998 | Tucker et al. | 719/316 |
| 6,094,688 A * | 7/2000 | Mellen-Garnett et al. | 719/328 |
| 6,237,135 B1 | 5/2001 | Timbol | |
| 6,338,089 B1 * | 1/2002 | Quinlan | 709/227 |
| 6,356,930 B2 * | 3/2002 | Garg | 709/201 |
| 6,385,643 B1 * | 5/2002 | Jacobs et al. | 709/203 |
| 6,557,009 B1 | 4/2003 | Singer et al. | |
| 6,591,272 B1 * | 7/2003 | Williams | 707/102 |
| 6,839,748 B1 * | 1/2005 | Allavarpu et al. | 709/223 |
| 6,842,906 B1 * | 1/2005 | Bowman-Amuah | 719/330 |
| 6,915,324 B1 * | 7/2005 | Allavarpu et al. | 709/200 |
| 6,931,455 B1 * | 8/2005 | Glass | 719/316 |
| 6,950,848 B1 * | 9/2005 | Yousefi'zadeh | 709/203 |
| 6,950,935 B1 * | 9/2005 | Allavarpu et al. | 713/168 |
| 6,990,511 B2 * | 1/2006 | Ferwerda et al. | 709/201 |
| 7,010,586 B1 * | 3/2006 | Allavarpu et al. | 709/223 |
| 7,058,717 B2 * | 6/2006 | Chao et al. | 709/226 |
| 7,203,947 B2 * | 4/2007 | Claar | 719/330 |
| 7,206,843 B1 * | 4/2007 | Allavarpu et al. | 709/226 |
| 7,228,346 B1 * | 6/2007 | Allavarpu et al. | 709/223 |
| 7,266,543 B2 * | 9/2007 | Evans et al. | 1/1 |
| 7,376,108 B2 * | 5/2008 | Lansio et al. | 370/338 |
| 7,426,211 B2 * | 9/2008 | Lansio et al. | 370/401 |
| 7,437,711 B2 * | 10/2008 | Brumme et al. | 717/120 |
| 7,478,403 B1 * | 1/2009 | Allavarpu et al. | 719/316 |
| 7,502,836 B1 * | 3/2009 | Menditto et al. | 709/217 |
| 7,546,353 B2 * | 6/2009 | Hesselink et al. | 709/216 |
| 2001/0010053 A1 * | 7/2001 | Ben-Shachar et al. | 709/105 |
| 2003/0037156 A1 * | 2/2003 | Mallart | 709/231 |
| 2004/0107280 A1 * | 6/2004 | Hasha | 709/224 |
| 2006/0069723 A1 * | 3/2006 | Ferwerda et al. | 709/203 |
| 2006/0277314 A1 * | 12/2006 | Hesselink et al. | 709/229 |
| 2007/0078978 A1 * | 4/2007 | Arnold et al. | 709/224 |
| 2009/0300653 A1 * | 12/2009 | Kukura et al. | 719/316 |

FOREIGN PATENT DOCUMENTS

| | | |
|---|---|---|
| WO | WO 00/23879 A | 4/2000 |

* cited by examiner

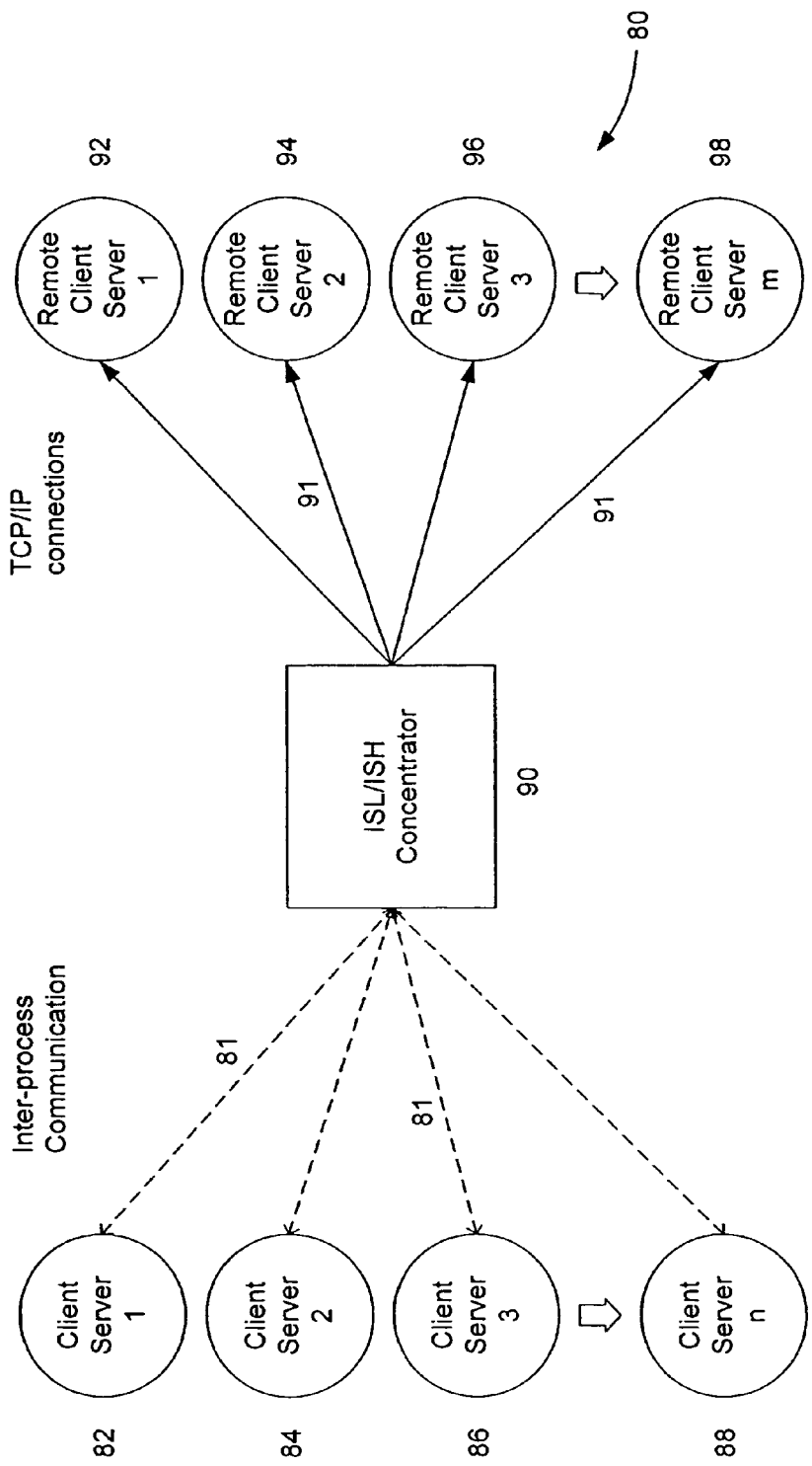

FIG. - 4

*n* client/servers (inside the domain) invoking on 1 remote server (outside the domain) via ISL/ISH intelligent concentrator results in 1 TCP/IP socket connection. On first invoke on object, client contact ISL to determine ISH to handle invoke. ISL maintains information about active TCP/IP socket connections in ISH processes, and concentrates invokes allowing request to be multiplexed over 1 connection.

Paired Second Outbound IIOP

Remote client/server connects to the domain, but does not supports bi-directional GIOP. Instead, remote client calls a method to notify WLE of its host/port address and WLE creates an outbound socket connection from the ISH to the remote client/server. The rest of the processing is identical to bi-directional outbound IIOP.

SYSTEM AND METHOD FOR CONCENTRATION AND LOAD-BALANCING OF REQUESTS

CLAIM OF PRIORITY

This application is a continuation of U.S. patent application Ser. No. 09/907,025, entitled "SYSTEM AND METHOD FOR CONCENTRATION AND LOAD-BALANCING OF REQUESTS", inventors Paul Ferwerda et al., filed Jul. 17, 2001; which claims the benefit of U.S. Provisional Application 60/221,057 entitled "SYSTEM AND METHOD FOR CONCENTRATION AND LOAD-BALANCING OF REQUESTS", inventors Pault Ferweda et al., filed Jul. 27, 2000; both of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to distributed computing environments, and specifically to a system and a method for reducing the number of Object Request Broker (ORB) connections in an Internet Inter-ORB Protocol (IIOP) environment.

BACKGROUND

In the field of the distributed computing, several architectures exist to allow machines to communicate with one another or to share distributed or net-centric applications. One of these architectures includes the Common Object Request Broken Architecture (CORBA). CORBA is an architecture design specification developed by the Object Management Group (OMG), an independent group devoted to developing standards for use in object-oriented computing. Examples of CORBA-compliant systems include Netscape's ONE product, and BEA System's Weblogic Enterprise Server.

CORBA provides a specification for the Interface Definition Language (IDL), which allows software developers to define interfaces to their object-oriented applications in a standard fashion. IDL includes mappings that allow IDL definition and types to be mapped to a variety of programming languages, including C, C++, and Java. Thus, CORBA allows developers to create "transparent" applications, which may be interpreted independent of the original programming language. Developer and third-party vendors create objects which interactwith one another through an Object Request Broker (ORB). Using language mappings, developers can create client-side "stubs" and server-side "skeletons", which the ORB's understand.

Since CORBA 2.0, the CORBA specification has included a method to allow ORB's to communicate seamlessly with each other. The ORB Interoperability Architecture, or more specifically, the General Inter-ORB Protocol (GIOP) standard, defines a set of message requests which ORB's may make over a network. Various flavors of GIOP exist, each tailored to the needs of a specific network transport. GIOP as defined by the OMG, comprises three components:

The Common Data Representation—a transfer syntax mapping IDL types to low-level types for use between network agents.

The GIOP Message Formats—of which there are currently seven, including client request, server reply, client cancel request, client locate request, server locate reply, server close connection, and message error.

The GIOP Message Transport Assumptions—including that: the transport is connection-oriented, reliable, can be viewed as a byte stream, provides reasonable notification of disorderly connection loss, and that the transport's model for initiating connections can be mapped onto the general connection model of TCP/IP.

A common GIOP implementation, which all ORB's must by specification be able to use, is the Internet Inter-ORB Protocol (IIOP). IIOP maps GIOP messages to TCP/IP, allowing the ORB to use a TCP/IP network, for example the Internet, as a communications bus or backbone. Referring to the pyramid structure 20 of FIG. 1, at the lowest level of the pyramid exists the Physical Device 22, for example an Ethernet card having a MAC (Media Access Control) address. Upon this sits the Ethernet protocol 24, which provides a connection-based, broadcast topology where messages are encoded and collisions resolved. The next layer is the Internet Protocol (IP) 26, which specifies the format of packets that traverse the Internet and supports hostnames and IP addresses. The hostname allows IP to be routed. Above IP is the Transport Control Protocol (TCP) 28, which adds the functionality of port number and control directives such as packet segmentation and time to live. This provides reliable, stream-based delivery. IIOP 30 is built upon TCP. Above IIOP sits the ORB level 32, which marshals the IIOP requests. At the top of the pyramid is the application level itself 34, which includes object implementations and other ORB objects and services, such as the Naming Service.

In such a distributed Object System as described above and, as further illustrated in FIG. 2, requests 50 are passed back and forth between processes requiring an object's function 42, 44, 46, 48 and the processes implementing an object's function 52, 54, 56, 58. The example of FIG. 2 shows n clients invoking upon m servers. With such a system 40 it is difficult to achieve scalability when there are n×m connections, where n represents processes requiring a group of object function and m represents the processes implementing the group of object functions. This is commonly known as a "fan-out problem", and leads to difficulties in ensuring system resources are sufficient enough to allow scalability. Techniques exist to allow concentration of requests through a concentrator process to an IIOP/ORB domain or group of object implementations. The problem is how scalability may be achieved going in the opposite direction, from the object implementations within the domain, to other object implementations outside of the domain.

SUMMARY OF THE INVENTION

To address the problem of scalability in Object Systems, an embodiment of the invention allows native clients, and servers acting as native clients, to invoke on a remote object reference. The ability to invoke on a remote object reference should be: scalable, robust, usable as a mechanism to carry out invocations on object references implemented in foreign ORB servers, usable as a mechanism to carry out invocations that are implemented in remote clients (client callbacks), and usable as a mechanism to carry out invocations that deliver events to remote clients.

One solution and embodiment of the invention is to utilize an intelligent concentrator process for requests going from within the domain to outside of the domain. One or more master processes are configured which load-balance requests across sub-processes which actually handle the requests. The master processes may dynamically add sub-processes as required by the load. Additionally, the master processes can allow concentration by ensuring that multiple requests from within the domain use the same actual connection for their requests to an object implementation outside of the domain. A multiplicity of these master processes allow for fail-over and recoverability in case a master process dies.

An embodiment of the invention allows both native clients, and native servers acting as clients, to invoke on object references whose implementation exists outside of an Internet Inter-ORB Protocol (IIOP) domain. This provides an underlying mechanism allowing for remote clients to receive events, for remote clients to receive callbacks and for native clients and servers acting as clients to invoke on object references whose implementation is in a remote server built with an Object Request Broker (ORB).

DESCRIPTION OF THE FIGURES

FIG. 4 shows for an embodiment of the invention how an ISL/ISH concentrator may be used to minimize the number of server connections required to service n clients.

DETAILED DESCRIPTION OF THE PREFERRED EMBODIMENT

Figure 1:
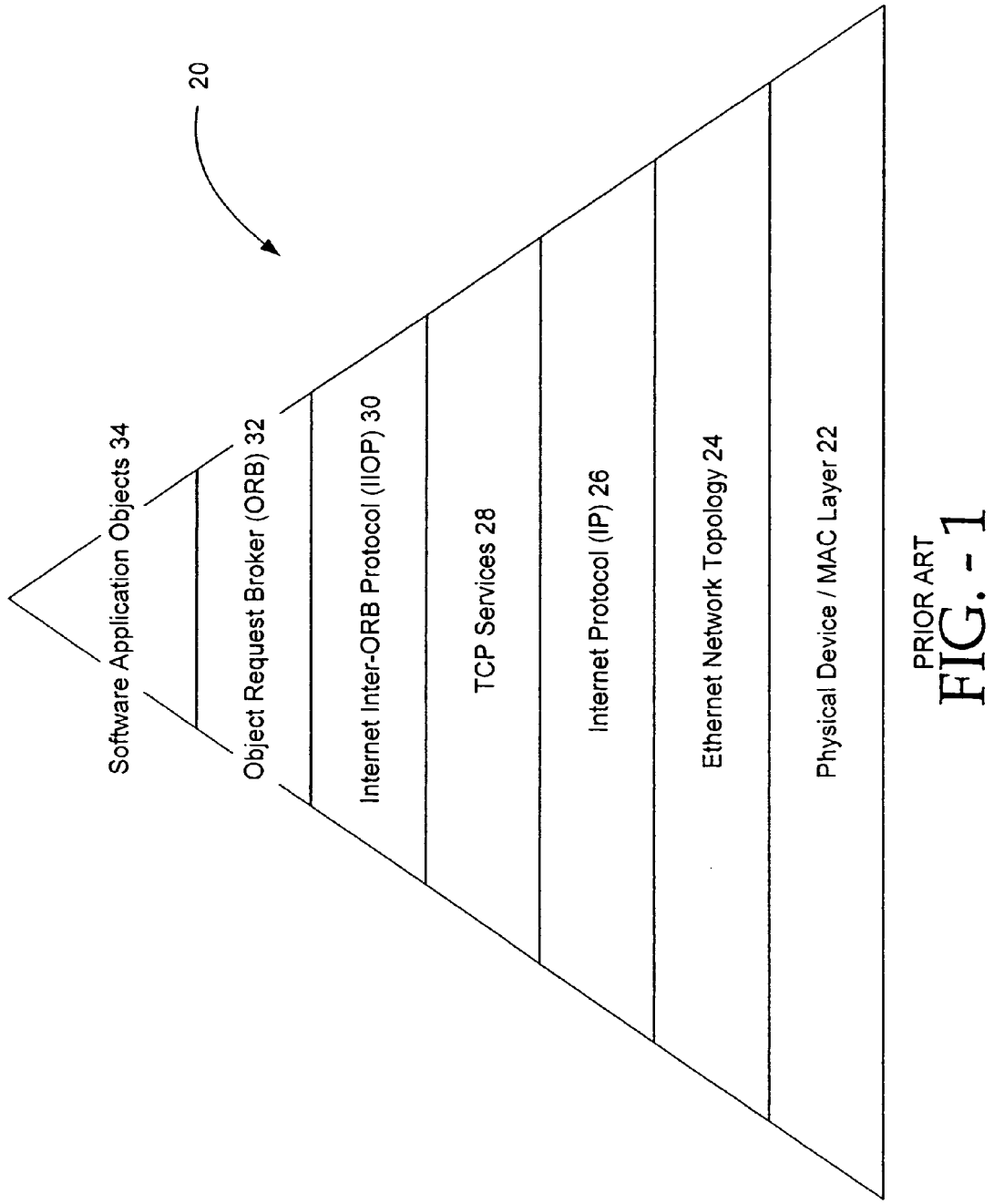
FIG. 1 illustrates how the IIOP and ORB layers relate to other network communication protocols in the prior art.

Various embodiments of the invention will now be described with respect to the accompanying figures. Several definitions are given below, which will be useful in the discussion of the preferred embodiments.

Client/Server—a machine or process which may act either as a client or as a server, or both.

Domain—a collection of machines and resources that may be administered as a unit. Domains can be set up based on application function, security needs, or geographical location, and are particularly useful in situations where multiple applications intercommunicate.

Native—a client or server located within the domain.

Callback—the ability to invoke on an object reference that has been created by a remote client (acting as a server) such that an IIOP request is delivered to the object implementation in the remote client.

Callout—the ability to take an object reference for some remote server and invoke on it such that a request is delivered to that remote server. The callout may be to a remote client acting as a server (callback) or to a remote ORB server.

ISH (IIOP Server Handler)—Refers specifically to the component that receives IIOP messages from remote clients, and forwards them as Tunneled GIOP (TGIOP) messages to native (or in-domain) servers. This component also receives the replies and makes sure they get back to the appropriate remote client. In one embodiment of the invention, the ISH will also receive TGIOP request messages from native clients/servers and send the IIOP request messages on to remote servers. This component receives the replies and makes sure they get back to the appropriate native client/server.

ISL (IIOP Server Listener)—Refers to the component that decides which ISH should handle a particular remote client conversation with a native server. The ISL handles fail-over for ISHs and load balancing of connections to native objects. In one embodiment of the invention, the ISL also decides which ISH should handle a particular conversation with a remote server for object references that are not located in a client connected to an ISH. The ISL concentrates connections for multiple invokes on identical remote objects.

Inbound IIOP—A concept known in the prior art which refers to initiating an IIOP request from a remote server to a native client within the domain.

Outbound IIOP—Refers to the inventions method of initiating an IIOP request from a native client, or server acting as a client, in the domain to a remote server not in the domain.

Asymmetric IIOP—In some versions of GIOP, IIOP connections are not symmetrical, e.g. only clients can send requests and only servers can receive them. If a server needs to send requests to an object in the client, it must create a second connection from the server to the client.

Bi-directional IIOP—connections between the client and server are symmetric, i.e. clients can send requests to servers on a connection and servers can send requests to objects exported by the client on the same connection.

IIOP Concentration

Figure 3:
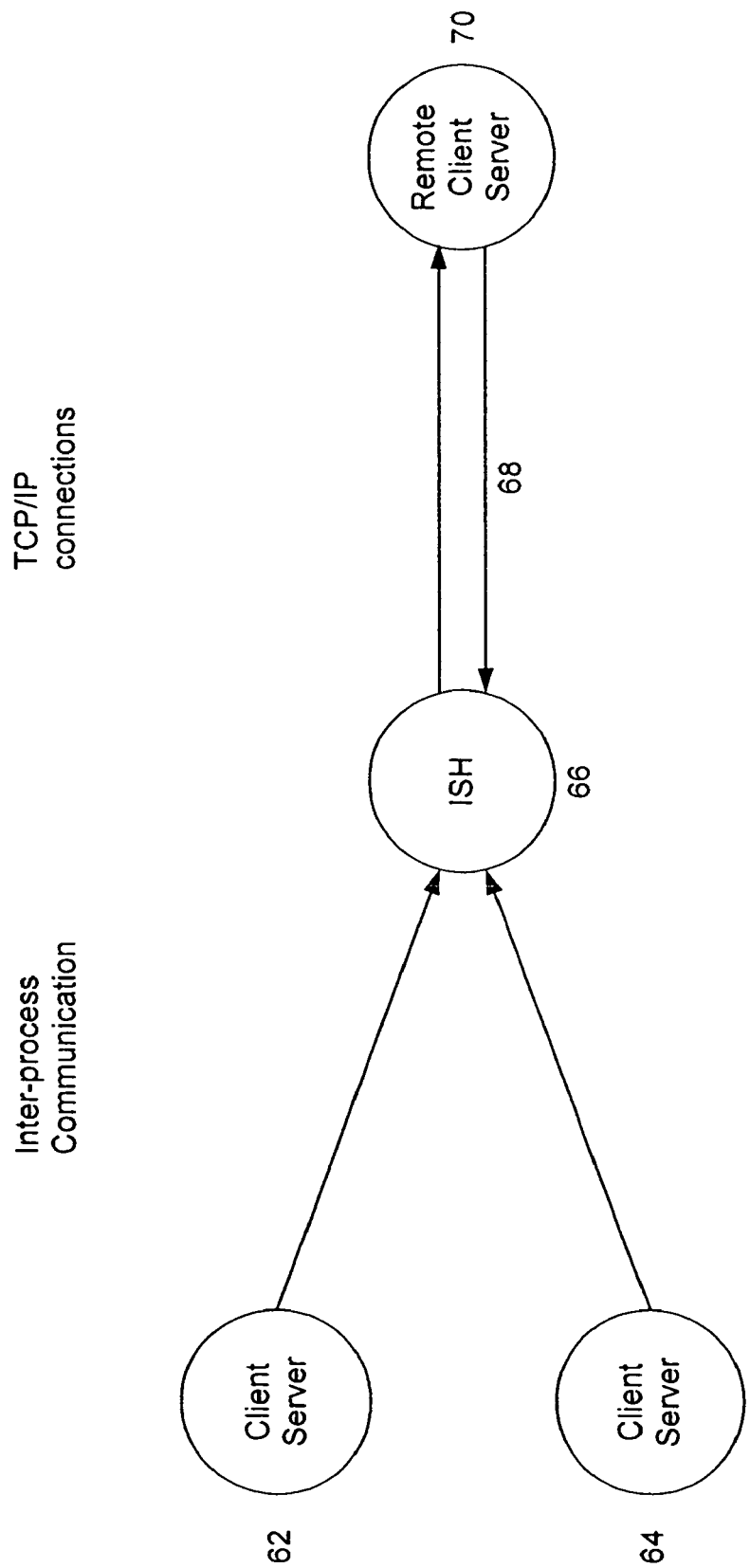
FIG. 3 shows for an embodiment of the invention how an ISH can be used to interface between multiple clients and a TCP/IP link to a server.

FIG. 3 shows a typical concentration process in an embodiment of the invention. Current systems only provides for inbound IIOP concentration—the invention adds support for outbound IIOP concentration. As shown in FIG. 3 an ISH concentrator 66 reduces the number of connections required on a remote client/server 70 by "concentrating" the connections from multiple local clients 62, 64 to operate over a single server link 68. Several clients are contained within the same domain as the ISH and communicate with each other by interprocess communication. Client/servers outside the domain (remote client/servers) communicate with the ISH via a standard TCP/IP link.

Figure 2:
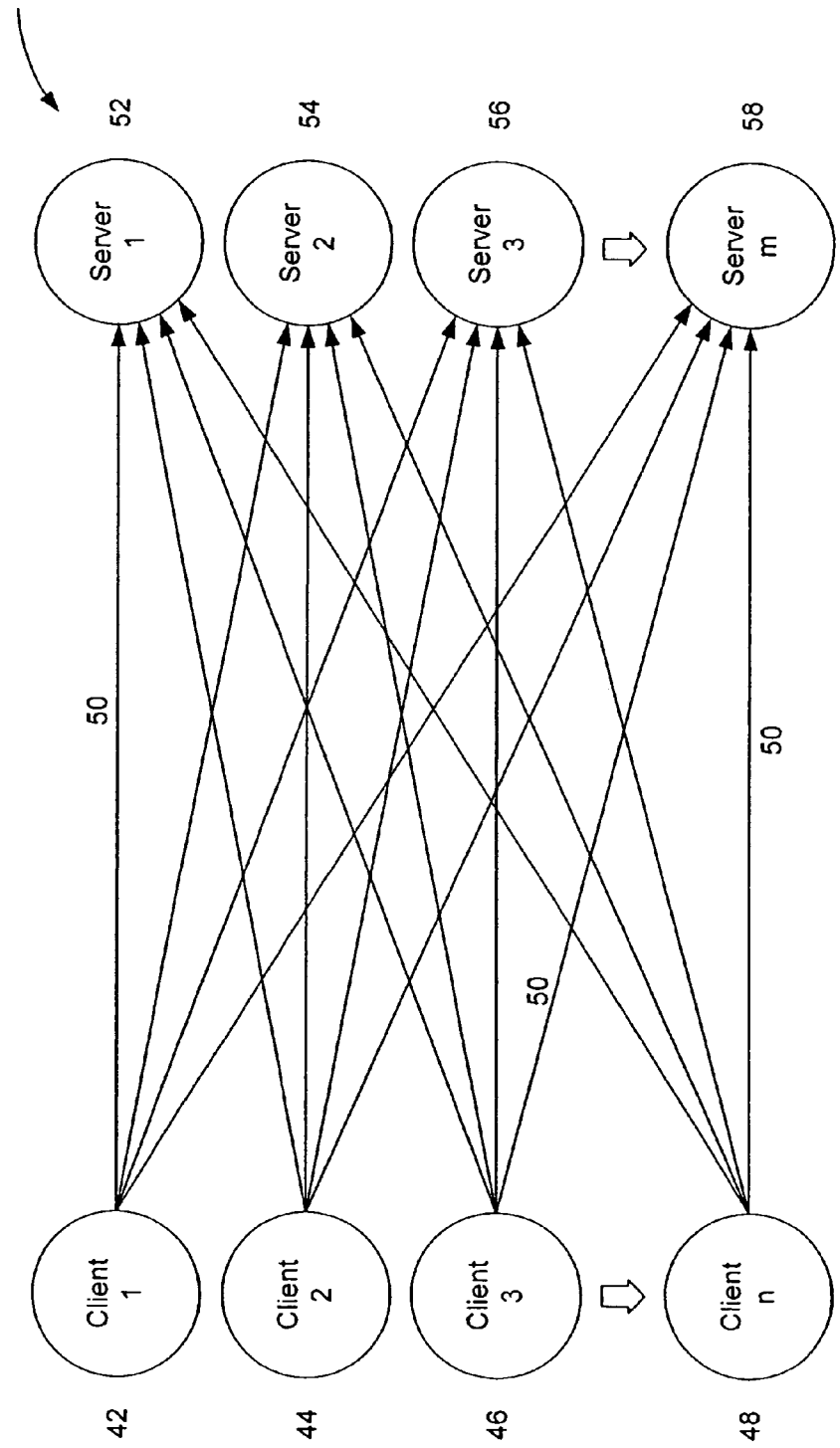
FIG. 2 illustrates a fan-out problem known in the prior art.

As illustrated in FIG. 4, an embodiment 80 of an ISH concentrator of the invention is used to improve the scalability of the system first depicted in FIG. 2, which again includes remote client/servers 92, 94, 96, 98 and multiple local clients 82, 84, 86, 88. An ISH 90 reduces the number of active connections 81, 91 from n×m to n+m. In one embodiment of the invention message queues are used to replace the direct link to the remote servers—this reduces the number of active connections to just n.

Outbound IIOP Support

Figure 5:
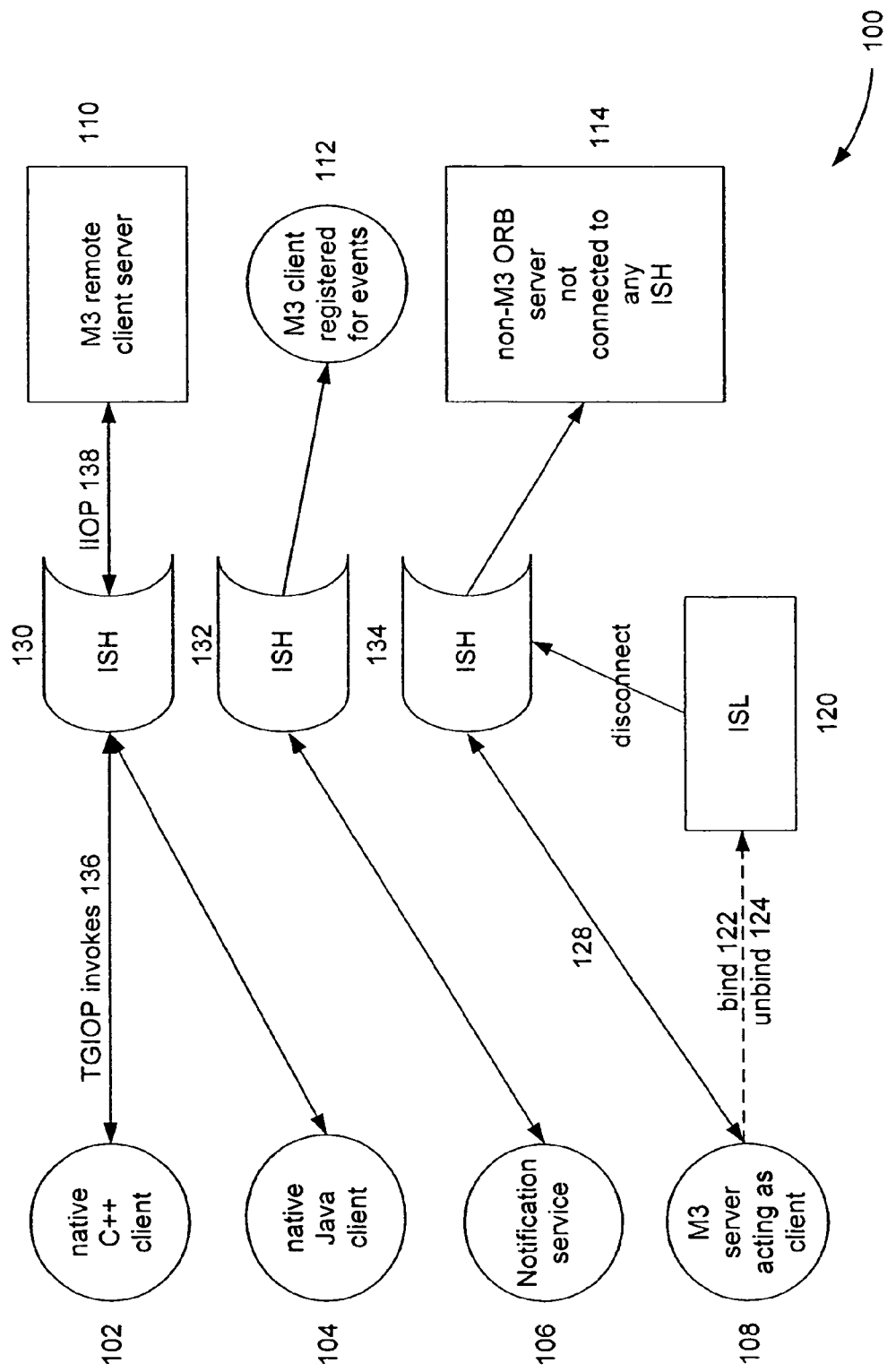
FIG. 5 illustrates an embodiment of the invention in which an ISL and multiple ISH's serve a variety of client and server types.

An exemplary system including one embodiment 100 of the invention is shown in FIG. 5. As illustrated, several clients invoke upon a series of remote servers. The client may be, for example, a native C++ client 102, a Java client 164, a notification service 106, or a native server acting as a client 108. The remote server may be another native server 110, a native client registered for events 112, or a non-native CORBA-compliant ORB server 114. When one of the clients invokes upon a server, a routing process directs the connection to the ISL 120 by calling a BIND service 122. The ISL determines which ISH 130, 132, or 134 is best suited to handle the connection. At least one ISH is thus required, although many ISH's may be used. The ISL determines which ISH to hand the connection to by first checking to see if any ISH currently handles a connection to the destination server. If none currently handle such a connection, then the least burdened ISH will be chosen. In this manner the ISL serves to balance the load of increasing number of connections among all available ISH's.

When an ISH is chosen 126, the client thereafter invokes that server via that ISH 128. Since the clients and ISH are within the same domain they may communicate using Tunneled GIOP (TGIOP) 136. The ISH's communicate with servers outside of the domain using IIOP over TCP/IP 138.

Outbound IIOP Support, as embodied in the invention, provides native clients, and servers acting as native clients, the ability to invoke on a remote object reference outside of the domain. This means that events are able to flow to remote clients that have registered for events, callbacks may be done to remote clients and objects in remote servers may be accessed. The Outbound IIOP Support comprises four functional parts:

Support for bi-directional IIOP to objects contained in clients connected to the ISH. If the remote ORB supports bi-directional GIOP 1.2, then the ISH can utilize the same connection to send requests and receive replies to/from the connected client.

Support for bi-directional-like IIOP to objects contained in clients connected to the ISH. If the ORB does not support bi-directional GIOP 1.2, then the client can call an Application Program Interface (API) to notify the ISH of the listening host/port in the client. The ISH utilizes a second paired outbound connection to send requests to, and receive replies from the connected client. This outbound connection is paired with the incoming connection. If the client disconnects the incoming connection, then the outbound connection is also torn down.

Support for invokes on an ISH or native client. The infrastructure supports routing to an ISH or native client based on the client information. The ORB is modified to embed client identifier information in an object reference.

Support for asymmetric outbound IIOP to objects not contained in clients connected to an ISH. The ISL allows for concentration of requests from different native clients/servers that are going to the same remote server to go through the same connection. The ISL will allow for load balancing of requests so that a specific connection does not get overburdened.

To support scalability, an ISL can start up additional handlers as necessary, and additional ISLs and additional ISHs can be added to support increased outbound IIOP traffic as necessary.

To support failover, multiple ISHs can be started on a machine or within the domain. If a client attempts to use an ISH unsuccessfully, an attempt will be made to rebind the object reference and failover to another ISH.

In a typical environment of an embodiment of the invention, system administrators may be the only users that will directly interact with the Outbound IIOP Support components. They are responsible for booting the ISL's with the correct startup parameters to enable outbound IIOP to objects not located in a connected client. The number of ISL's booted, and the various startup parameters, may be adjusted in order to obtain the best configuration for their installations specific workload characteristics.

Outbound Routing

Figure 6:
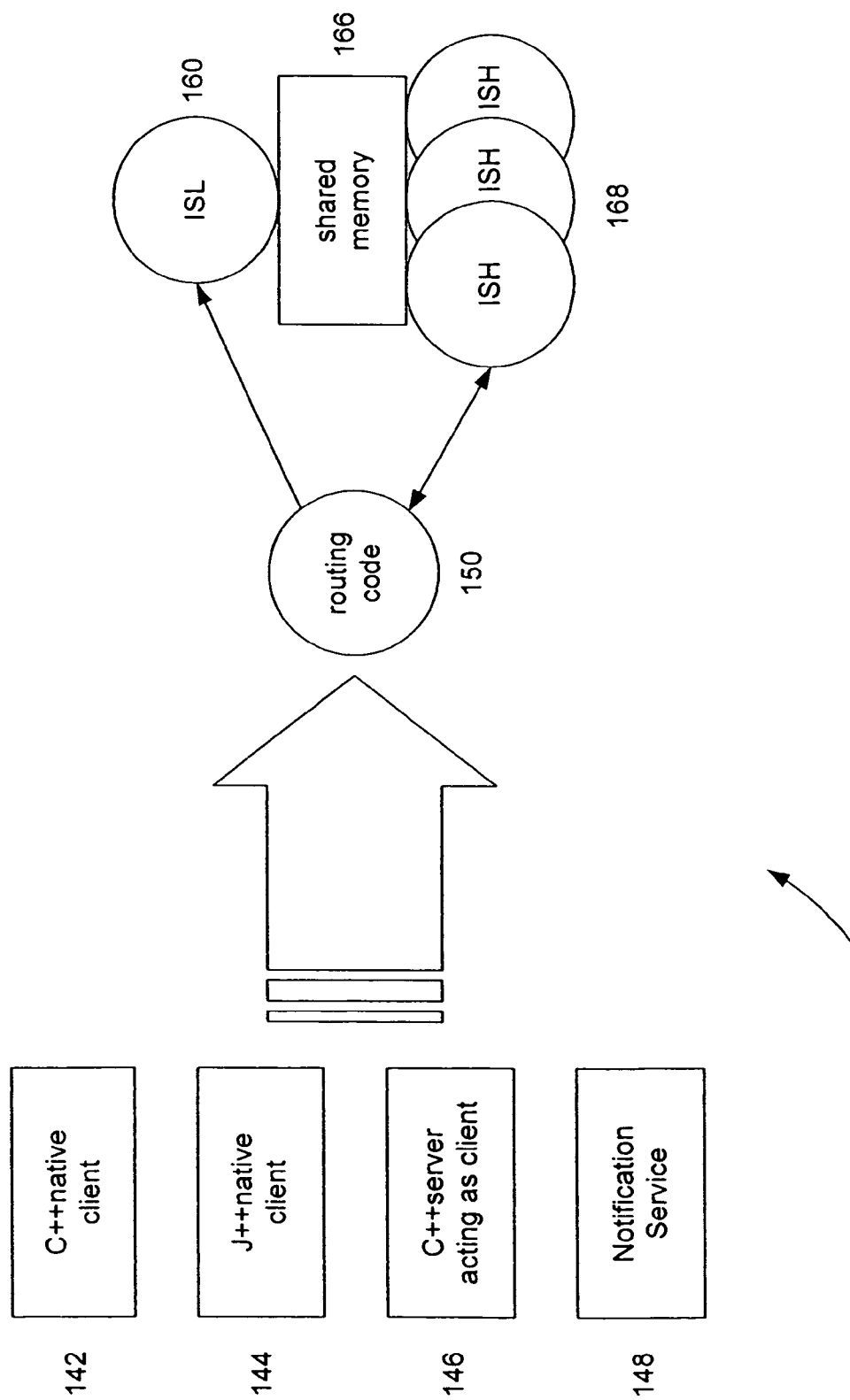
FIG. 6 shows for an embodiment of the invention how the routing code interacts with the ISL and the ISH(s).

Functional features in the outbound routing process are shown in FIGS. 6-9. As shown in FIG. 6 the ISL 160 and the ISH's 168 (several are shown for demonstration purposes, although the system 140 may operate with only one ISH) communicate with each other via a shared memory 166. In one embodiment of the invention the ISL is responsible for maintaining information about connections to remote servers. A record of such connections is kept in the shared memory. The ISH's use this information to allow invokes upon the remote servers. In return, the ISH's maintain the information in the shared memory by updating it to reflect closed or torn-down connections. The ISL then uses the updated information to better allocate incoming requests for invokes. A client 142, 144, 146, 148 seeking to invoke upon a remote service calls a routing code 150. The routing code interacts with the ISL to determine whether a connection already exists, and if so passes it off to the respective ISH. If a connection does not already exist the ISL chooses an ISH to service the new connection.

Figure 7:
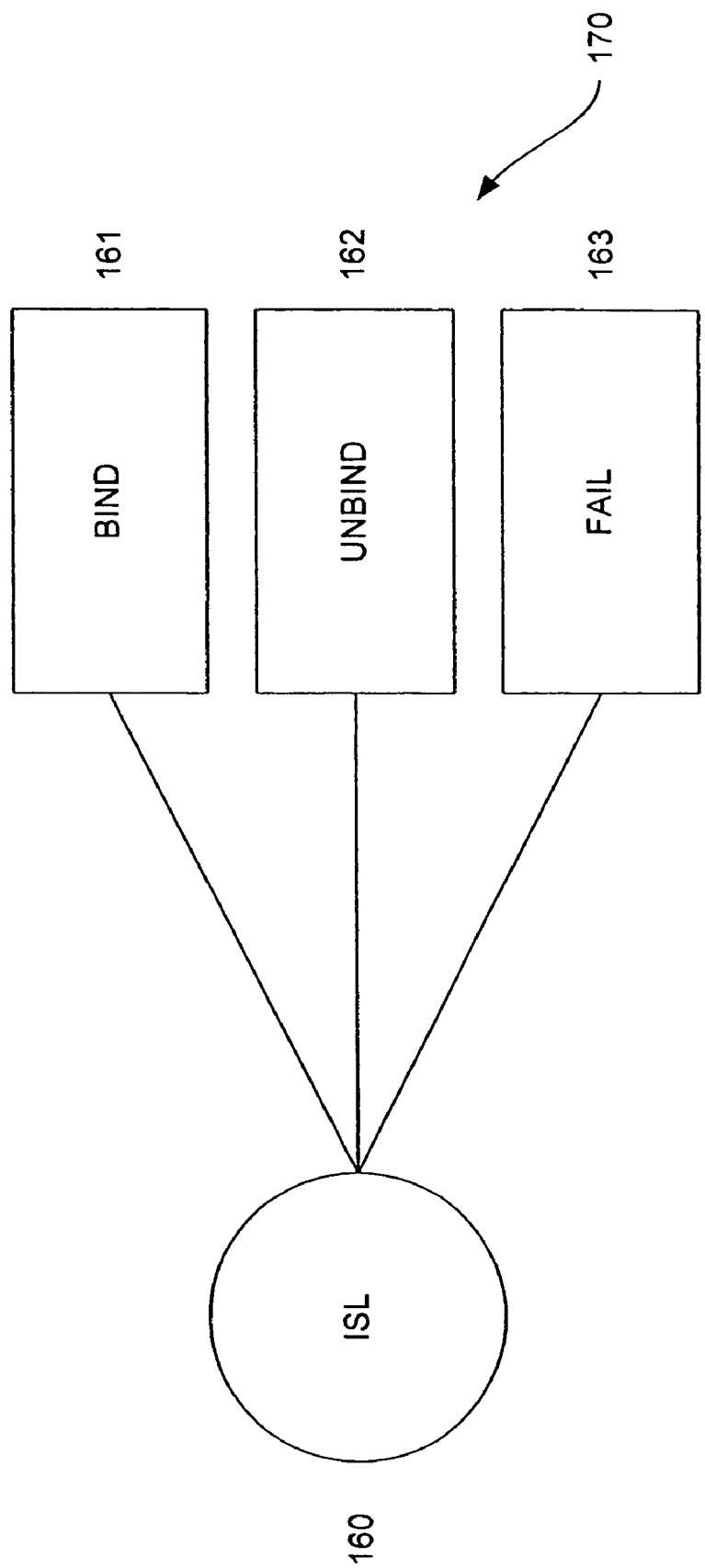
FIG. 7 shows for an embodiment of the invention the services contained in the ISL.
Figure 8:
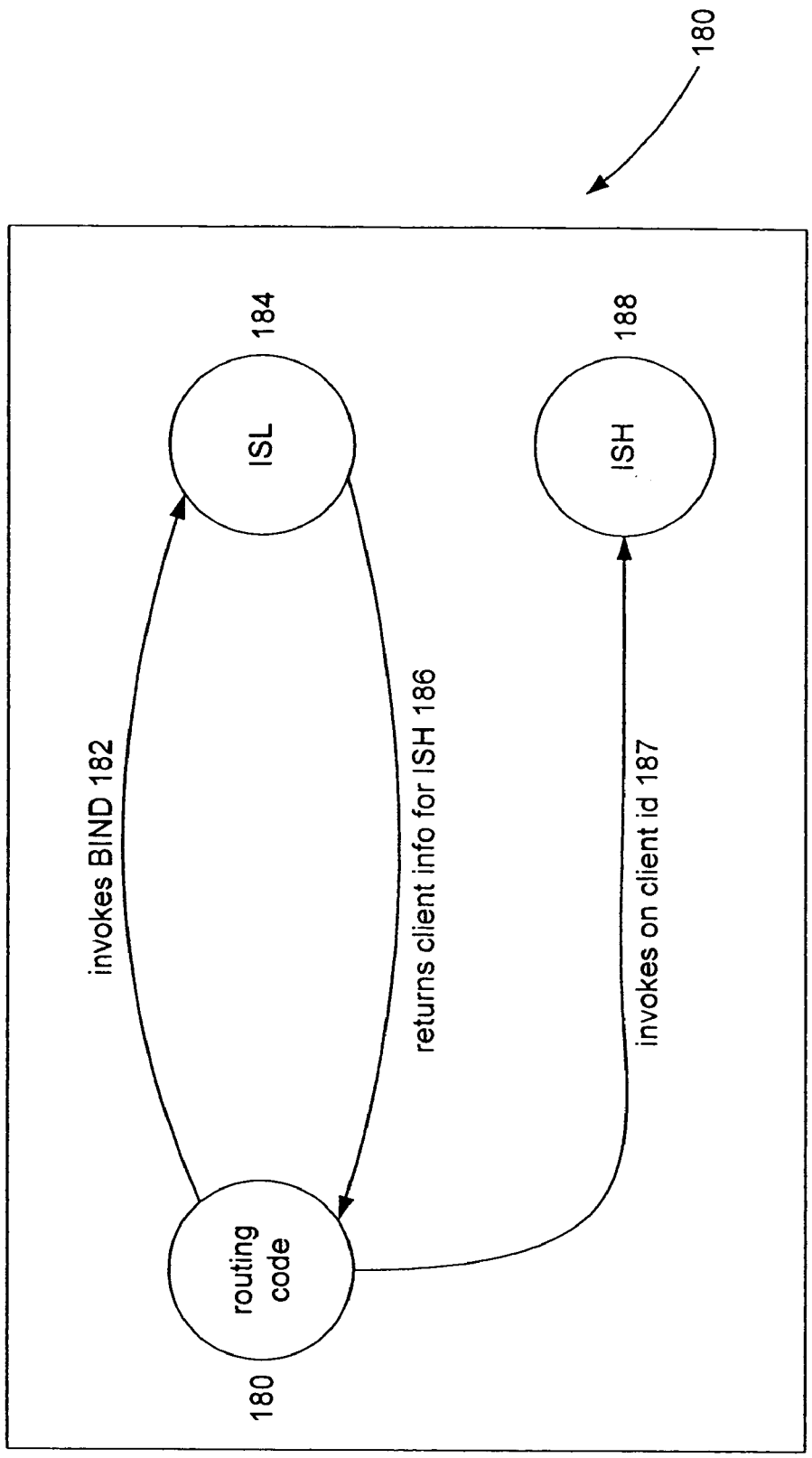
FIG. 8 shows for an embodiment of the invention steps in the routing/binding process.
Figure 9:
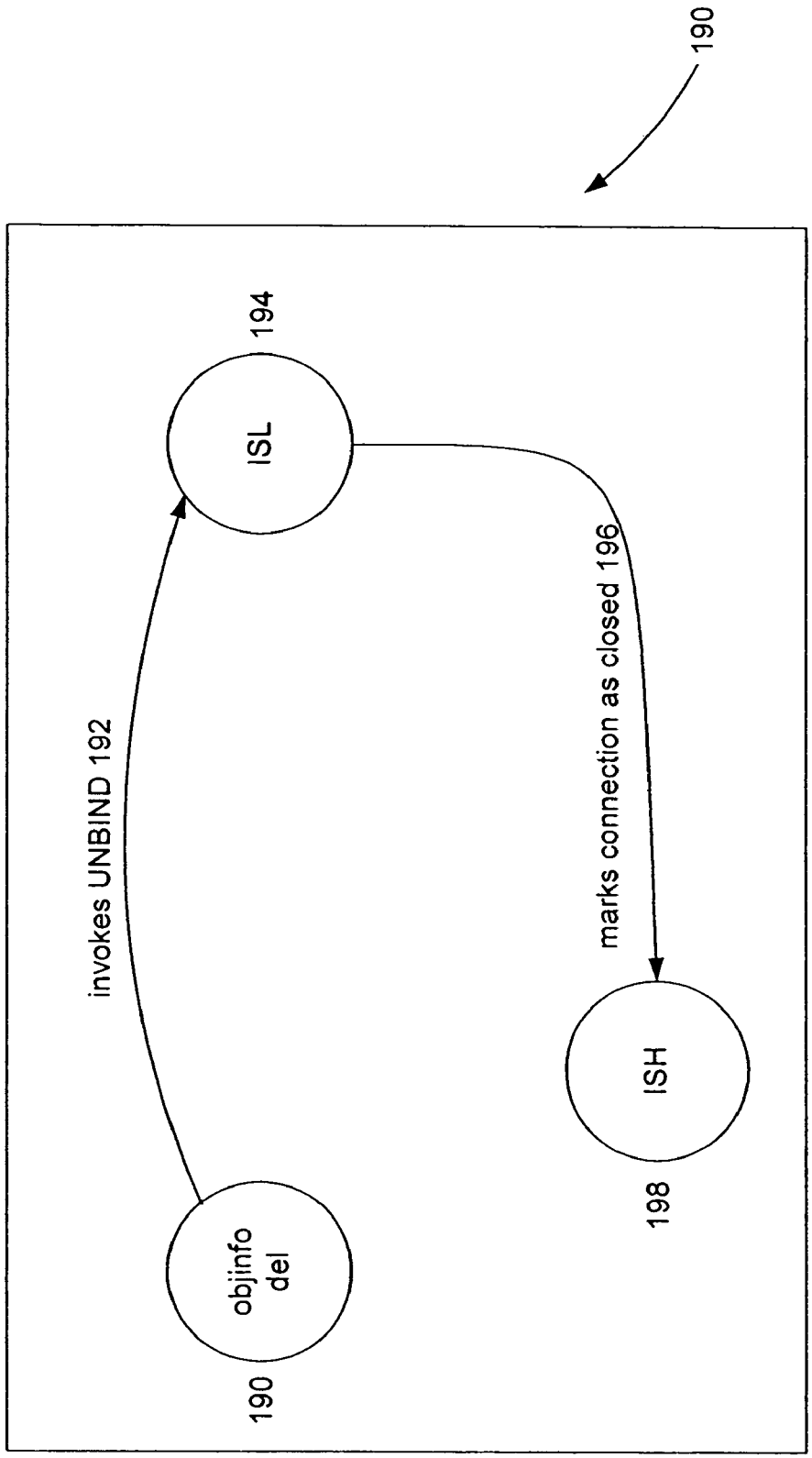
FIG. 9 shows for an embodiment of the invention the unbinding process.

FIG. 7 shows some of the services 170 the ISL 160 advertises or makes available to the clients. Principally, a client may request via the routing code to BIND 161 or UNBIND 162 from the ISL. An error routine 163 handles failed requests. As shown 179 in FIG. 8, the routing code 180 invokes a BIND 182 upon the ISL 184 which considers the remote server and determines an appropriate ISH to use 188. It passes this information back to the client 186. The client thereafter invokes 187 upon the specified ISH. The ISH thereafter handles the communication between the client and the server. As further shown 189 in FIG. 9, when the client is finished 190 with the server instance, or requests the connection be closed, the application invokes an UNBIND 192 upon the ISL 194. The ISL then marks the connection closed 196. After a period of time the entry for that particular connection will be removed from the shared memory in a garbage collection process.

Outbound IIOP Types

Figure 10:
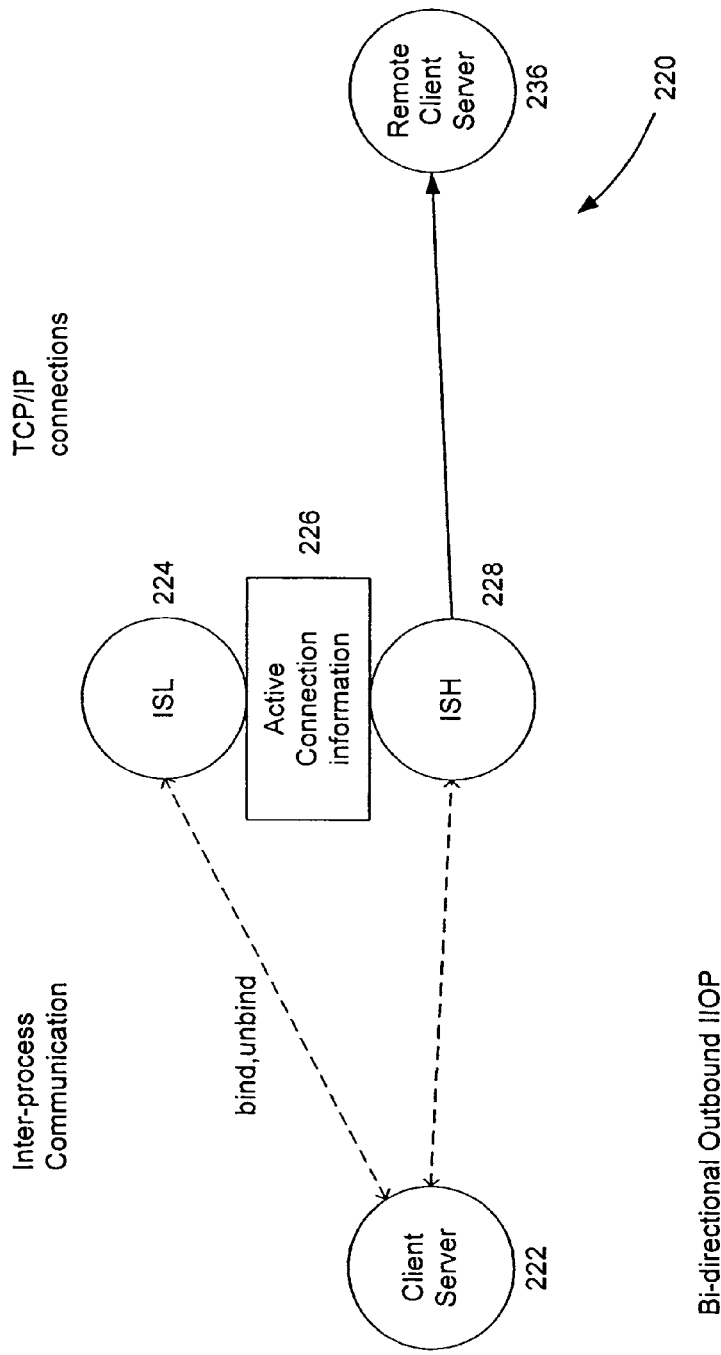
FIG. 10 illustrates an outbound IIOP embodiment of the invention using a bi-directional connection.

There are three different types of Outbound IIOP:
Bi-directional Outbound IIOP reusing the same connection
Bi-directional-like Outbound IIOP via a second paired connection
Asymmetric Outbound IIOP via a second connection Bi-directional Outbound IIOP An embodiment 220 of the invention includes ISL/ISH support 224, 226, 228 for bi-directional IIOP to objects contained in clients connected to the ISH (FIG. 10). If the client ORB supports bi-directional GIOP 1.2, then the ISH will utilize the same connection to send requests and receive replies to/from the connected client. A client 222 will create an object reference and invoke on a native server. The client ORB will identify the connection as being bi-directional using the service context. The service context will travel with the message to the native server 236. When unmarshalling the object reference, the native server will compare the host/port in the service context with the host/port in the object reference. If they match, the ORB will add the ISH client identifier and other client information needed for routing to a tagged component in the object reference. This client information will travel with the object reference whenever it is passed to other native servers.

At some point, a native server or native client will invoke on the object reference. The routing code will invoke on the appropriate ISH given the client information. The ISH send the request to the client over the same client connection. The client will execute the method and send the reply back to the ISH via the client connection. The ISH will receive the reply and send it to the native server.

Outbound IIOP Via Paired Second Connection

Figure 11:
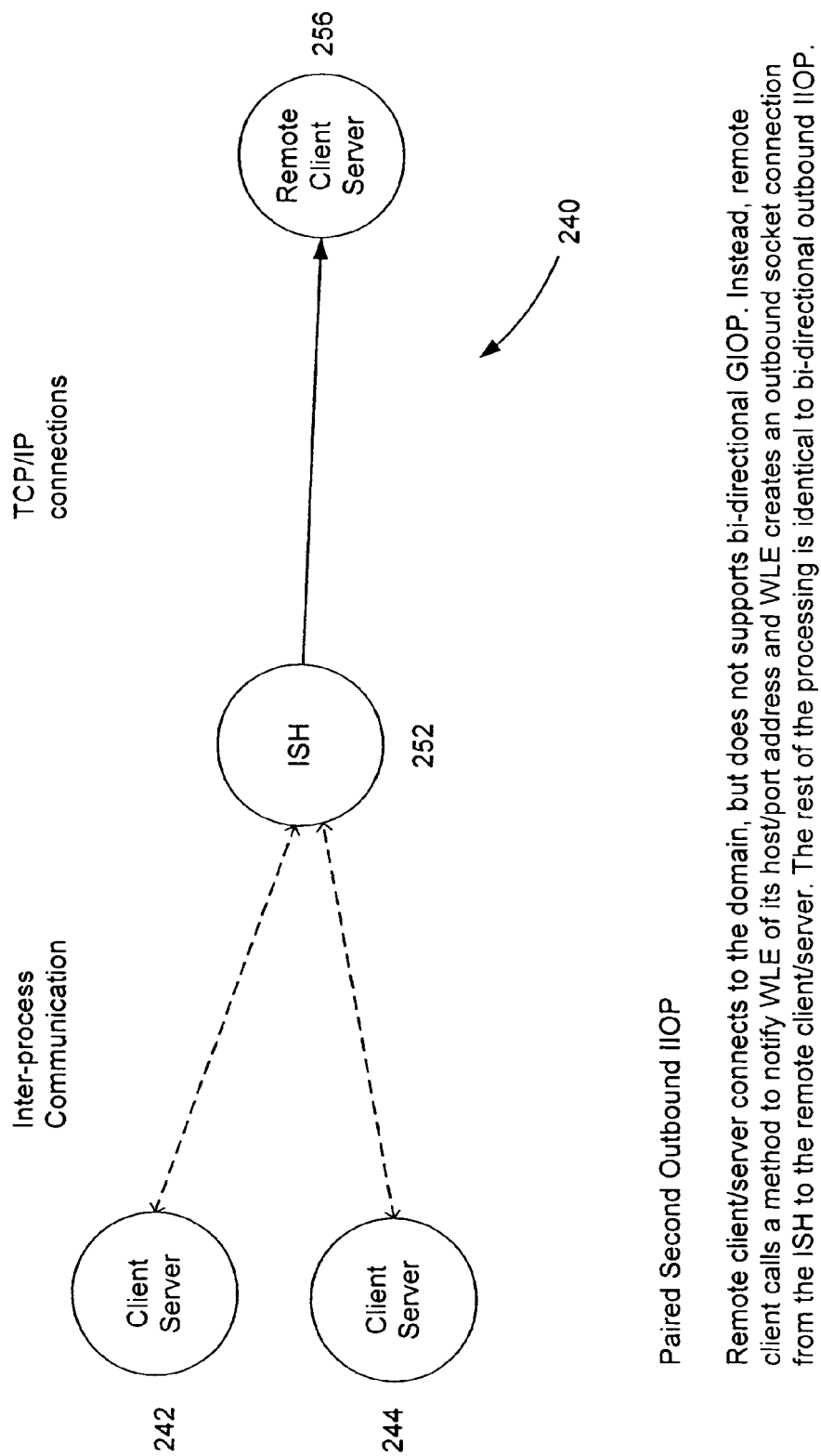
FIG. 11 illustrates an outbound IIOP embodiment of the invention using a paired connection.

An embodiment 240 of the invention also includes ISH support for bi-directional-like IIOP to objects contained in clients connected to the ISH (FIG. 11). If the client ORB does not support bi-directional GIOP 1.2, then the client 242, 244 can call an API routine to notify the ISH 252 of the listening port in the client. The ISH then creates a separate paired outbound connection, including an outbound socket connection from the ISH to the remote client/server 256, to send requests and receive replies to/from the connected client.

A client will create an object reference. It then calls a Bootstrap function passing the object reference. The ISH will get the host/port from the Interoperable Object Reference (IOR), and store it with the client context. The client will invoke on a native server passing the object reference. The ISH will create a service context containing the host/port from the register call. This service context travels with the message to the native server. When unmarshalling the object reference, the native server will compare the host/port in the service context with the host/port in the object reference. If they match, the ORB adds the ISH id and client information to a tagged component in the object reference. This client information travels with the object reference whenever it is passed to other native servers.

At some point, a native server or native client will invoke on the object reference. The routing code will invoke on the appropriate ISH passing the client information. The ISH will create a second connection to the client. It will send the request to the client over the second connection. The client will execute the method and send the reply back to the ISH via the client connection. The ISH will receive the reply and send it to the native server. If the client disconnects from the ISH, then the second connection will also be disconnected.

Asymmetric Outbound IIOP

Figure 12:
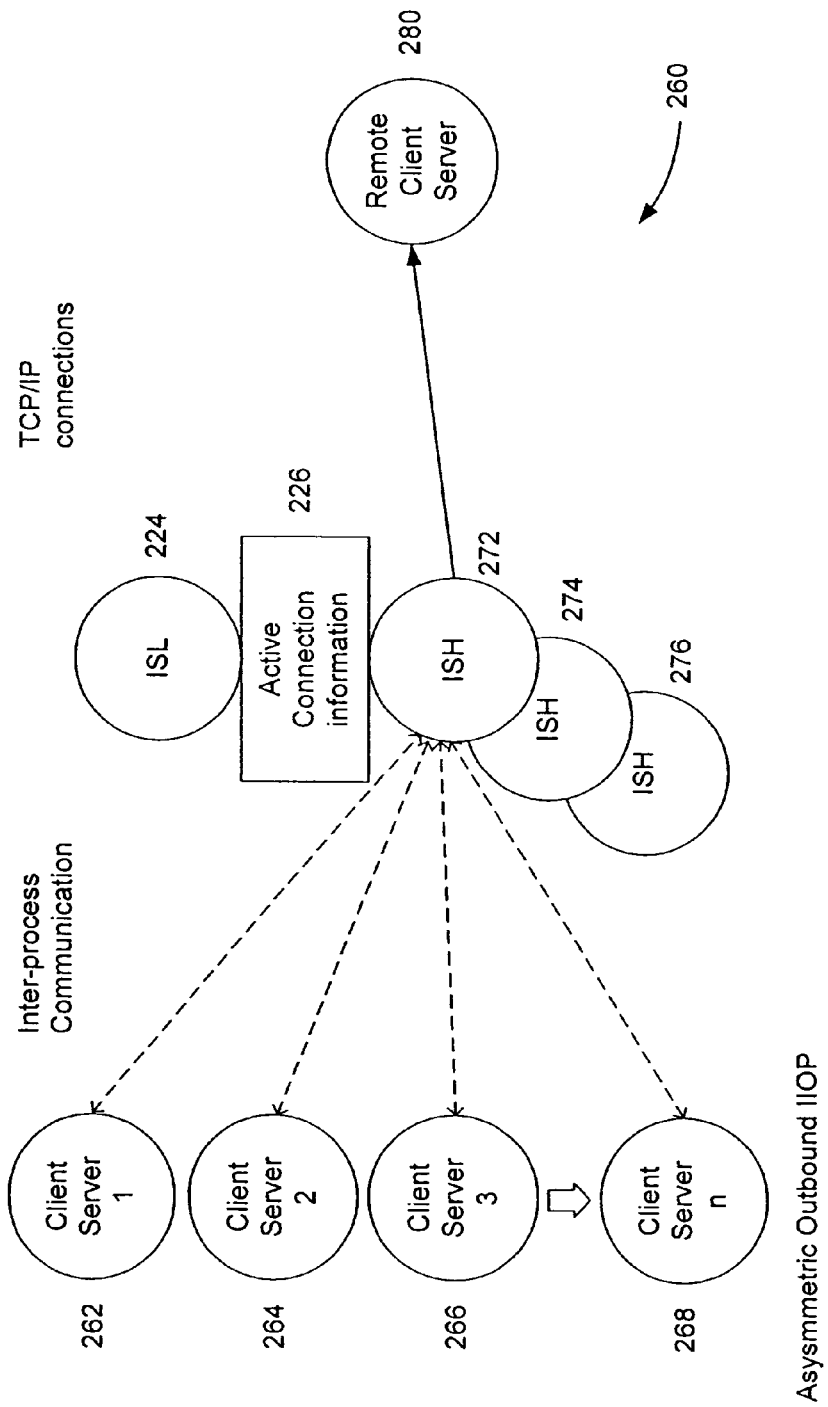
FIG. 12 illustrates an outbound IIOP embodiment of the invention using an asymmetric connection.

Embodiments 260 of the invention also include ISL/ISH support for asymmetric outbound IIOP to objects not contained in clients connected to an ISH (FIG. 12). The ISL 224 uses active connection information 226 that allows for concentration of requests from different native clients/servers 262, 264, 266, 268 that are going to the same remote server 280 to go through the same connection. The ISL can allow for load balancing of requests so that a specific connection does not get overburdened. A server 280 will get an object reference from some source, which could be a naming service, or passed in through a client, but not located in that client. Since the object reference is not located in a client connected to an ISH 272, 274, 276, the outgoing call can not be made using the bi-directional method.

At some point, a native server or native client will invoke on the object reference. On the first invoke, there is no ISH id and client information contained within the object reference. The routing code will recognize the object key as a non-native server object reference. If no ISH id and client information is passed, then the routing code will invoke a service in the ISL 224 passing the host/port. The ISL will return a service name to use to unbind the object reference and the client information of the ISH 272. This is the client information of the ISH, not the client information of any client connected to the ISH.

The ORB will invoke on the object reference. The infrastructure will invoke on the ISH. The ISH will get the connection identifier from the client information and determine 226 which outgoing connection to use to send the request to the client. If none is connected, then the ISH will create a separate connection to the host/port. The ORB will utilize the appropriate GIOP version for the version of IIOP profile in the IOR. The client will execute the method and send the reply back to the ISH via the separate connection. The ISH will receive the reply and send it to the native server.

Process Flow

The following are detailed process flow descriptions, which illustrate how the client, ISL, and ISH interact in one embodiment of the invention:

From the Perspective of the Native Client

At object reference bind time the ORB determines if the object reference is remote. If so, the ORB is initialized with client information from the object reference (if present). If client information is not present, then a BIND flag is specified. Otherwise, no flag is specified.

A routing code determines if it has a remote object reference.

If the BIND flag is present: calls the BIND service. Stores returned ISH client information and ISL information in shared memory.

If the BIND flag is not present: Stores client information in shared memory.

The routing code looks in the shared memory for client identifier and invokes on it.

When the connection is torn down the system looks inside the shared memory for the appropriate entry and calls UNBIND.

The ISL in turn marks connection as closing in shared memory so ISH closes it.

From the Perspective of the ISH

The ISH is invoked using the client id.

The ISH receives the message from the message queue. A request is handled in a inverse manner to a reply.

The infrastructure switches the ISH to the appropriate context based on the client. If asymmetric Outbound IIOP, then the context is the ISH context (O), not a client context.

A copy of the IIOP request is made, and the IIOP request id is replaced with a unique id. The request is placed on a list of outstanding requests for this context.

If the context is a client context, then it has a bi-directional connection or a paired second connection. If paired second connection and the connection does not yet exist, then one is created. Routines are called to send the IIOP request to the client. The routines buffer the request until the connection is completed. Else, routines are called to send the IIOP request to the client.

If the context is the ISH context, the connection index is used to determine the outbound connection. If there is not an existing connection, then one is created. Routines are called to send the IIOP request to the client. The routines buffer the request until the connection is completed. If there is an existing connection, the routines are called to send the IIOP request to the client.

The ISH handles network and message queue events. When a reply comes back from a connection, the list of outstanding requests is searched for the corresponding request. The ISH replaces the unique id with the original request id and sends the reply back to the client.

From the Perspective of the ISL

The ISL is invoked on the first invoke on an object reference.

The service routine is called to bind the object reference. The parameters are the host, the port, and the client identifier.

The ISL hashes the host/port and looks in the data structures to determine if the host/port is already in use. If in use and not at the multiplex user limit, then the appropriate ISH client identifier, domain, client process identifier, client queue, ISL group and server identifier are returned.

The user multiplex reference count is incremented.

If not found and an existing ISH can handle the connection, then the existing ISH is assigned to handle the request. The appropriate ISH client id, domain, client process identifier, client queue, ISL group and server identifier are returned.

If no ISH can handle the connection, then a new ISH is started. The appropriate ISH client identifier, client process identifier, client queue, ISL group and server identifier are returned.

Connection Management

Connection management is the process by which embodiments of the invention handle connections between the clients and the servers, and specifically how the system handles connections it evaluates are not currently in use.

One of the goals of the invention is that of scalability. Therefore, it is desired to minimize the number of outbound connections. For this reason, the system supports bi-directional connections and paired second connections in order to have an efficient mechanism to invoke on objects contained within connected clients. These cases comprise the majority of outbound IIOP traffic. However, there may still be scenarios where customers want to invoke on object references not contained in a currently connected client. This could be object references for foreign ORB servers; client/servers who connect and disconnect from the native domain; or any object reference obtained from a name server. In order to support these type of object references, but still provide scalability, the system relocates these TCP/IP connections from the caller process to an ISH. The caller (native client or native server) invokes on the IOR and the native infrastructure is used to send the message to an ISH. The ISH then sends the message to the remote server using the TCP/IP connection. However, since these TCP/IP connections are no longer in the actual caller process, they are not automatically torn down when the caller (native client or native server) exits.

Asymmetric outbound IIOP connections (not currently used by any callers) should be torn down if the caller (native client or native server) exits. This could be immediately after the last caller exits or it could be after some timeout period. The different alternatives for managing asymmetric outbound IIOP connections are described in the following sections.

Reference Counting and Validation of Users
This alternative works as follows:
The native client or native server (user of the object reference) invokes on an object reference.
On the first invoke, the ORB makes a call to the BIND service in the ISL. An entry for this host/port is added to the shared memory. An entry for the identifier of the user (native client identifier or native server group/srvid) is added to the shared memory. The ISL returns a connection identifier (maps to the host/port entry in the shared memory) and the appropriate client information for an ISH that will contain the TCP/IP connection to the remote server.
The ORB uses the client information to send the message to the appropriate ISH. The ISH uses the connection identifier to determine which outbound IIOP connection to use.
The native client or native server continues to perform invokes on the object reference. Each invoke results in a message sent to the ISH.
If another native client invokes on an object reference with the same host/port, the BIND service will return the same connection identifier and the same client information as the first user. The reference count of the host/port entry will be incremented. An entry for the identifier of the second user (native client or native server) is added to the shared memory.
Eventually, the first and second users release the object reference. The first user release results in a call to the UNBIND service, which decrements the reference count of host/port entry and removes the identifier of the user. On the second user release, the reference count of the host/port entry is decremented to zero. The ISL removes the host/port entry from the shared memory and marks the connection entry (different from host/port entry) as closing in the shared memory.
The ISH closes the connection when it sees that the connection entry in the shared memory is marked as closed. It marks the connection entry as unused.

This is the case where the user exits normally and releases object references. Other cases include the user exiting without releasing object references and the user abnormally exiting. In order to ensure that connections are released when no longer needed, this alternative uses validation, in which the ISL validates the identifier of users of the connection; stores the id's in the shared memory; checks to see if a server is inactive; and if on the local machine, the ISL will compare a timestamp to see if the native client is still active; or uses a call to validate a native client that is not on the same machine as the ISL.

Asymmetric Outbound Connection Timeout with No Unbind
This alternative works as follows:
The native client or native server (user of the object reference) invokes on an object reference.
On the first invoke, the ORB calls the BIND service in the ISL. An entry for this host/port is added to the shared memory. The ISL returns a connection identifier (maps to the host/port entry in the shared memory plus an additional generation/timestamp field) and the appropriate client information for an ISH that will contain the TCP/IP connection to the remote server.
The ORB uses the client information to send the message to the appropriate ISH. The ISH uses the connection identifier to determine which outbound 10P socket to use. If the connection identifier is no longer valid (due to connection timeout), then an error is returned.

The native client or native server continues to perform invokes on the object reference. Each invoke results in a message sent to the ISH.

If another native client invokes on an object reference with the same host/port, the BIND service will return the same connection identifier and the same client information as the first invoke. No reference counting will be performed on the host/port entry.

Eventually, the first and second users release the object reference. No unbind service is called. The connection stays up.

On each invoke, the ISH updates an activity timestamp field in shared memory for the connection. On a regular basis, the ISL will timeout the connection if no activity takes place within a user specified time period. The ISL will mark the connection as closed and remove the host/port entry. The ISH will disconnect the connection when it sees the connection has been marked as closed. It marks the connection entry as unused. If the users of an connection die or do not release object references, then the connection will stay up as long as it is active. It will be torn down when it has not been active for the specified time period. An object reference may still be valid, but not used within the specified timeout period. In this case, the connection will be torn down and the host/port entry removed. The ISH will receive the request, validate the connection id, and return an error. This error will cause the ORB to rebind the object reference. This will involve a call to the ISL BIND service and an existing connection may be used or a new connection may be created. This rebind should not be visible to the user.

Reference Count with Asymmetric Outbound Connection Timeout

This is a combination of alternative 1 and 2. The main difference is that connections are torn down as soon as no one is using them. This alternative works as follows:

The native client or native server (user of the object reference) invokes on an object reference.

On the first invoke, the ORB calls the BIND service in the ISL. An entry for this host/port is added to the shared memory. The ISL returns a connection identifier (maps to the host/port entry in the shared memory plus an additional generation/timestamp field) and the appropriate ISH id and client information for an ISH that will contain the TCP/IP connection to the remote server.

The ORB uses the ISH id and client information to send the message to the appropriate ISH. The ISH uses the connection identifier to determine which outbound IIOP connection to use. If the connection identifier is no longer valid (due to connection timeout), then an error is returned.

The native client or native server continues to perform invokes on the object reference. Each invoke results in a message sent to the ISH.

If another native client invokes on an object reference with the same host/port, the BIND service will return the same connection identifier and the same client information as the first invoke. The reference count of the host/port entry will be incremented.

Eventually, the first and second users release the object reference. The first user release results in a call to the UNBIND service. It decrements the reference count of host/port entry. On the second user release, the reference count of the host/port entry is decremented to zero. The ISL removes the host/port entry from the shared memory and marks the connection as closing in the shared memory.

The ISH closes the connection when it sees that the connection entry in the shared memory is marked as closed. It marks the connection entry as unused.

If the users of an connection die or do not release object references, then the connection will stay up as long as it is active. It will be torn down when it has not been active for the specified time period. An object reference may still be valid, but not used within the specified timeout period. In this case, the connection will be torn down and the host/port entry removed. On a subsequent invoke, the ISH will receive the request, validate the connection identifier, and return an error. This error will cause the ORB to rebind the object reference. This will involve a call to the ISL BIND service and an existing connection may be used or a new connection may be created. This rebind should not be visible to the user.

Additional Features

Use of Bi-directional Connections for Callout

In some scenarios a client may connect, create a persistent subscription to an event, and then disconnects from the ISH. When the client reconnects to an ISH, it then expects to receive events for that persistent subscription.

In one embodiment of the invention, the ISL knows about current bi-directional connections and then uses them instead of creating a separate connection to the host/port in the IOR. Notifying the ISL of bi-directional connections allows for the optimal use of resources. The ISH notifies the ISL of the bi-directional information. This requires locking of the shared memory or extra messages on connection creation and deletion.

Client Disconnection

Figure 13:
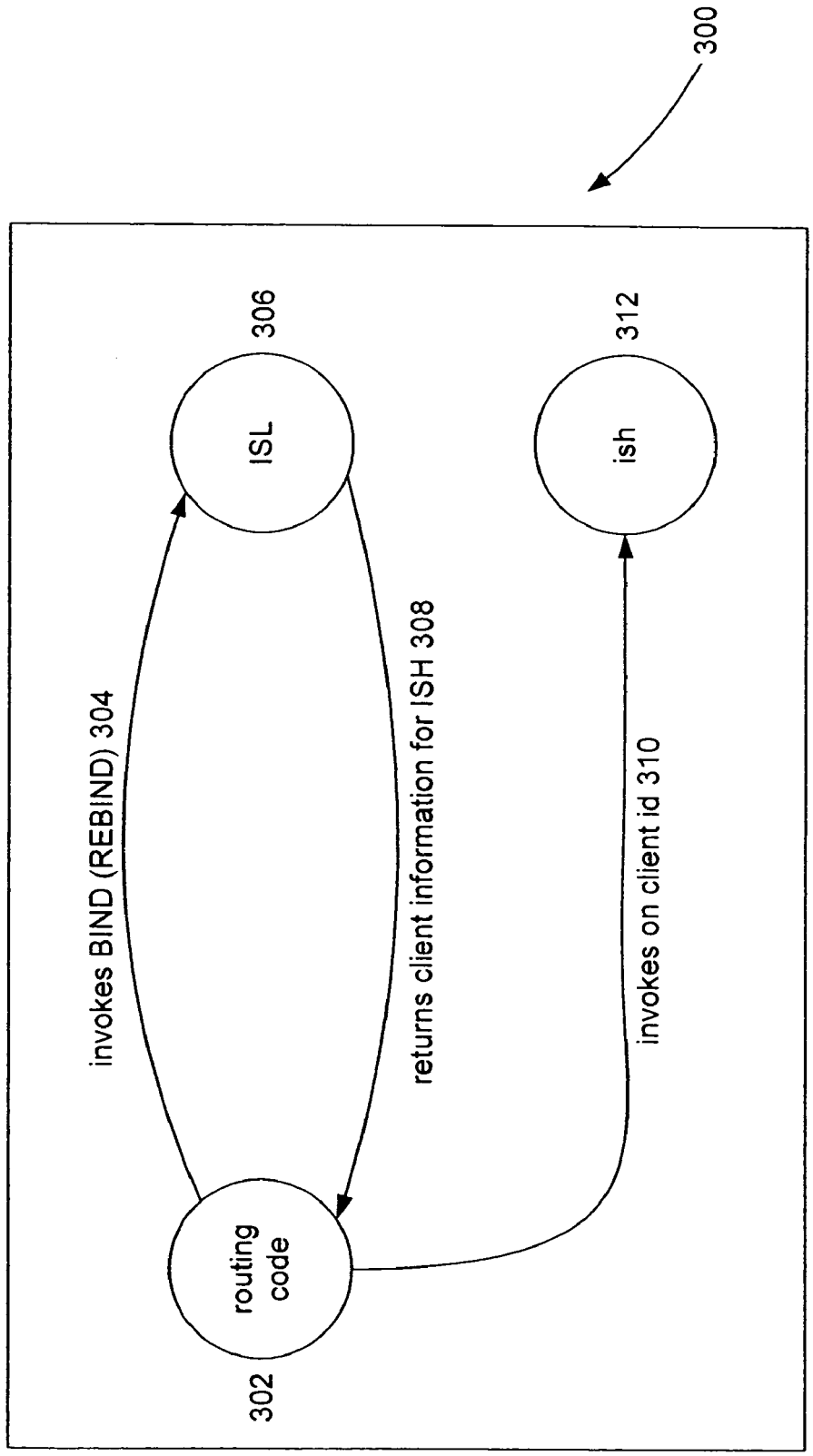
FIG. 13 shows for an embodiment of the invention how a bidirectional connection may be rebound after a client has disconnected.

In this scenario 300, illustrated in FIG. 13, the client has disconnected from the domain, but is still listening at the same host and port. The object reference contains the client information 302 of the disconnected client. When the ORB invokes upon an unavailable service, the infrastructure will return an error. The ORB will handle this error and rebind 304 the object reference. An ISH 312 will be selected by the ISL 306 to create a new connection to the remote server, and the client information will be updated 308, 310.

Data Design

The ISL and ISH each have data that they keep in memory. They also share memory for items that need to be persistent across the life of the ISL and its ISHs. If an ISL dies and restarts, it will reattach to the shared memory and will be able to recover any state that has been saved in that shared memory.

Shared Memory

The ISL shares memory with the ISHs that it controls. If asymmetric outbound IIOP is enabled, then additional sections will be present in the shared memory table. This memory is used by the ISL to do appropriate concentration and load balancing and is used by the ISH to keep track of which connections it needs to create. The ISL is the primary writer of the shared memory.

ISH Failure

The ISH has to keep information around that does not need to be in shared memory. Among the information that does not need to be shared is areas for holding information about the current request, areas to map request ids to clients (server). The ISL is responsible for restarting an ISH. When it restarts the ISH, it will clear out the old shared memory slots for the dead ISH and ensure that the ISH will connect to that ISL's shared memory.

If a client invokes on an object reference bound to the ISH that failed, an error will occur. The caller will rebind, and an ISH will be selected to perform the invoke. This could be the restarted ISH or another ISH.

ISL Failure

The ISL will eventually restart if the system administrator started it with recommended settings. If an object code was invoking the service, but has not yet selected the server, then an alternative ISL will be selected. If the object code was invoking the service and selected the server then the system returns an error to the client. When the ISL eventually restarts it will reconnect to the shared memory.

Native Client (or Server Acting as a Client) Failure

The ISL will periodically scan the list of outbound connections. If a connection has not been active in the timeout period specified, then the corresponding entry will be freed and the outbound connection disconnected. This will ensure that outbound connections created by native clients or servers will always be torn down if the native client or server fails.

Garbage Collection

There are "events" that can cause some portion of shared memory to be cleaned up:

- Remote server fails. The ISH will return an error to the client (or clients if multiple clients were using the connection). When the client exits and the ISL is notified it will clean out the appropriate host and port slot and appropriate client identifier slot(s).
- The ISH realizes that a connection has exceeded the timeout set by the administrator. The corresponding entry will be freed and the socket will be marked as closing. On the next invoke, an error will be returned to the caller, and the ORB will rebind the object reference. A new connection will be created and the invoke will occur.
- The ISH dies. The ISL restarts the ISH. On the next invoke on that bound object reference, an error will occur. The caller will rebind and an ISH will be selected to perform the invoke. The existing entries for the ISH will remain in the shared memory. On the first invoke, the restarted ISH will connect to the remote server.
- The ISL dies. At restart time, it checks all ISHs and cleans up entries for any ISH that has died.
- The ISL is shutdown. The ISL sends shutdown messages to the ISH. The ISL removes the shared memory.
- The machine crashes and ISL and all the ISHs die at the same time. The shared memory disappears.

Other features, aspects and objects of the invention can be obtained from a review of the figures and the claims. It is to be understood that other embodiments of the invention can be developed and fall within the spirit and scope of the invention and claims.

INDUSTRIAL APPLICABILITY

The invention has particular use in the field of Object-Oriented systems, and specifically CORBA-compliant systems where n clients may invoke upon m servers. Typically this would require n×m number of connections to handle the requests. The invention described allows there to be only m connections on the server which significantly reduces resource requirements and allows scalability. The invention further allows for multiple intelligent master concentrator processes, to tackle concentrator failure and offer dynamic scalability.

What is claimed is:

1. A system in a distributed object environment that supports server connection concentration, comprising:
    a plurality of connection handlers to handle a plurality of connections from a plurality of clients to a plurality of remote servers; and
    a listener, running on one or more microprocessors, which determines which particular connection handler of the plurality of connection handlers to handle a particular connection;
    wherein the listener upon receiving a request from a client of the plurality of clients to invoke an object on a remote server of the plurality of remote servers performs steps of:
        first checking to see if any connection handler currently handles a connection to the remote server;
        choosing a least burdened connection handler to balance a load among all available connection handlers;
        starting a connection handler to handle the request, if no existing connection handler can handle the connection; and
        connecting the remote server to another connection handler and updating a shared memory of the plurality of connection handlers, if the corresponding connection handler cannot handle the connection;
        receiving an object reference from the remote server, wherein the object reference contains connection information at the remote server;
        associating the object reference with the connection handler that handles the connection to the remote server;
        calling an object binding routine to bind the object reference, together with host, port, and client identifier parameters; and
        invoking the connection handler to forward the request to the remote server and reply to the client.

2. The system of claim 1, wherein the object is a service at the server.

3. The system of claim 1, wherein the client is any one of a native C++ client, a JAVA client, a notification service, or a native server acting as a client.

4. The system of claim 1, wherein the remote server is any one of a native server, a native client registered for events, or a non-native CORBA-compliant Object Request Broker (ORB) server.

5. The system of claim 1 wherein the request is received via a message queue.

6. The system of claim 1 wherein the request is an Internet Inter-ORB Protocol (IIOP) request, and wherein the connection handler performs steps of:
    replacing an original IIOP request id for the IIOP request with a unique id;
    placing the request on a list of requests for this context;
    sending the IIOP request to the server; and
    when a response is received from the server, searching the list of requests for the corresponding request, replacing the unique id with the original IIOP request id, and sending the response to the client.

7. The system of claim 1, wherein upon receiving the request to invoke the object on the remote server the listener performs further steps of adding client information to the object reference received from the remote server and passing the object reference to another remote server.

8. The system of claim 1, wherein the listener maintains a reference count that indicates the number of object references invoked at any one of the plurality of remote servers, and closes a connection to a particular remote server once the reference count is decremented to zero.

9. A method in a distributed object environment that supports server connection concentration, comprising the steps of:
  handling, via a plurality of connection handlers, a plurality of connections from a plurality of clients to a plurality of remote servers;
  associating a listener with the plurality of connection handlers; and
  upon receiving a request at the listener to invoke an object on a remote server of the plurality of remote servers, performing the steps of:
    first checking to see if any connection handler currently handles a connection to the remote server;
    choosing a least burdened connection handler to balance a load among all available connection handlers;
    starting a connection handler to handle the request, if no existing connection handler can handle the connection; and
    connecting the remote server to another connection handler and updating a shared memory of the plurality of connection handlers, if the corresponding connection handler cannot handle the connection;
    receiving an object reference from the remote server, wherein the object reference contains connection information at the remote server;
    associating the object reference with the connection handler that handles the connection to the remote server;
    calling an object binding routine to bind the object reference, together with host, port, and client identifier parameters; and
    invoking the connection handler to forward the request to the remote server and a reply to the client.

10. The method of claim 9, further comprising:
allowing the object to be a service at the server.

11. The method of claim 9, further comprising:
allowing the client to be any one of a native C++ client, a JAVA client, a notification service, or a native server acting as a client.

12. The method of claim 9, further comprising:
allowing the server to be any one of a native server, a native client registered for events, or a non-native CORBA-compliant ORB server.

13. The method of claim 9 further comprising:
allowing the request to be received via a message queue.

14. The method of claim 9 further comprising:
  allowing the request to be an IIOP request;
  replacing, via the connection handler, an original IIOP request id for the IIOP request with a unique id;
  placing, via the connection handler, the request on a list of requests for this context;
  sending, via the connection handler, the IIOP request to the server; and
  when a response is received from the server, searching the list of requests for the corresponding request, replacing the unique id with the original IIOP request id, and sending the response to the client.

15. A machine readable memory having instructions stored thereon that when executed by one or more processors cause a system to perform the steps of:
  handling, via a plurality of connection handlers, a plurality of connections from a plurality of clients to a plurality of remote servers;
  associating a listener with the plurality of connection handlers; and
  upon receiving a request at the listener to invoke an object on a remote server of the plurality of remote servers, performing the steps of:
    first checking to see if any connection handler currently handles a connection to the remote server;
    choosing a least burdened connection handler to balance a load among all available connection handlers;
    starting a connection handler to handle the request, if no existing connection handler can handle the connection; and
    connecting the remote server to another connection handler and updating a shared memory of the plurality of connection handlers, if the corresponding connection handler cannot handle the connection;
    receiving an object reference from the remote server, wherein the object reference contains connection information at the remote server;
    associating the object reference with the connection handler that handles the connection to the remote server;
    calling an object binding routine to bind the object reference, together with host, port, and client identifier parameters; and
    invoking the connection handler to forward the request to the remote server and a reply to the client.

* * * * *